United States Patent [19]

Coates

[11] 4,272,255
[45] Jun. 9, 1981

[54] APPARATUS FOR GASIFICATION OF CARBONACEOUS SOLIDS

[75] Inventor: Ralph L. Coates, Salt Lake City, Utah

[73] Assignee: Mountain Fuel Resources, Inc., Salt Lake City, Utah

[21] Appl. No.: 58,764

[22] Filed: Jul. 19, 1979

[51] Int. Cl.³ .............................................. C10J 3/20
[52] U.S. Cl. ......................................... 48/63; 48/67; 48/77; 122/5; 422/201
[58] Field of Search .................... 48/62 R, 63, 64, 67, 48/73, 77, 76, 207; 422/200, 201, 207, 205; 110/216; 122/5

[56] References Cited

U.S. PATENT DOCUMENTS

| | | | |
|---|---|---|---|
| 1,722,496 | 7/1929 | Chapman | 122/5 |
| 2,179,638 | 11/1939 | Koppers | 48/67 |
| 2,931,715 | 4/1960 | Eastman | 48/63 |
| 3,951,615 | 4/1976 | Gernhardt et al. | 48/76 |
| 3,988,123 | 10/1976 | Coates | 48/73 |

FOREIGN PATENT DOCUMENTS 2705558 8/1978 Fed. Rep. of Germany .............. 48/77

Primary Examiner—S. Leon Bashore
Assistant Examiner—Michael Goldman
Attorney, Agent, or Firm—Mallinckrodt & Mallinckrodt

[57] ABSTRACT

The apparatus of U.S. Pat. No. 3,988,123 is improved by constructing the heat recovery stage as a relatively elongated water-wall type of heat exchanger within a pressure shell, rather than of shell and tube type. The heat exchanger is advantageously formed from contiguous, externally finned, vertical tubes that are rigidly joined together to form a laterally closed, heat recovery chamber, the fin portion of one being welded along its tip to the tube portion of another adjoining such fin portion. The heat exchanger tubes preferably continue vertically throughout substantially the entire height of the gasification reaction i.e. combustion chamber of the first stage of the apparatus, completely eliminating the intermediate quench stage of the patented apparatus and serving to recover heat from the combustion stage as well as from the heat recovery stage by a heat exchange fluid, such as water, flowing through the tubes. The pressure shell may closely encircle the water-wall, except along the lower end portion thereof, where diameter is such as to provide an annular outflow channel abruptly reversing flow of the downflowing gases within the heat recovery chamber and thereby effecting separation of solids from the product gas. A quench stage of residual solids is below the open lower end of the heat exchanger and constitutes the third, rather than the second, stage of the apparatus.

2 Claims, 3 Drawing Figures

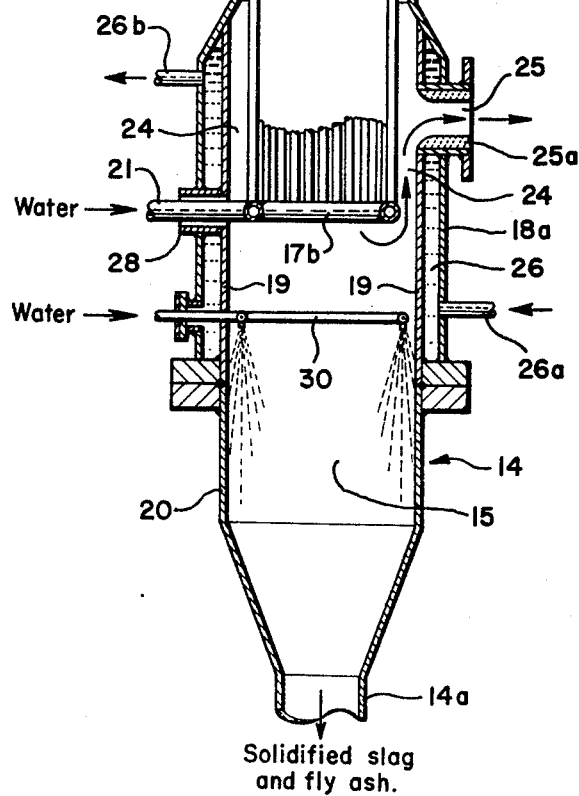

4,272,255

APPARATUS FOR GASIFICATION OF CARBONACEOUS SOLIDS

BACKGROUND OF THE INVENTION

1. Field:

The invention is concerned with apparatus for gasification of carbonaceous solids, such as finely divided coal, and particularly with the type of apparatus disclosed by Coates U.S. Pat. No. 3,988,123 of Oct. 26, 1976.

2. State of the Art:

The Coates apparatus of U.S. Pat. No. 3,988,123 was developed at Brigham Young University and the Eyring Research Institute under funding provided by the United States Energy Research and Development Administration for carrying out a process of gasification concurrently developed. It constitutes an advanced form of apparatus for gasification of carbonaceous solids and provides a series of three processing stages in vertical arrangement. The uppermost or combustion stage comprises a gasification reaction chamber into which are fed the reactants, usually a stream of oxygen and steam and a separate stream of gas-entrained carbonaceous solids. The reaction gases and molten ash in the form of slag globules descend through a second, i.e. water quench, stage to and through a third, i.e. heat recovery, stage comprising a shell and tube heat exchanger. The product gas and the particulate solidified slag are passed to a separate scrubber stage for separation.

SUMMARY OF THE INVENTION

Principal objectives in the making of the present invention were to provide for a greater recovery of the heat residual to that utilized and generated in operation of the apparatus, to accommodate thermal expansion of heat transfer surfaces, and to minimize if not entirely eliminate the chance of molten slag deposition and build-up in the apparatus.

In accordance with the invention, these objectives were achieved by utilizing an elongate, water-wall type of heat exchanger within a pressure shell for the heat recovery stage, instead of a shell and tube arrangement as in the patented apparatus, and by placing such heat recovery stage between the combustion stage and the water quench stage. The water-wall and pressure shell preferably extend upwardly from the heat recovery chamber along substantially the entire height of the combustion chamber, closely encircling and supporting the refractory walls of such combustion chamber of both recover heat therefrom and to effect cooling of the refractory to minimize deterioration thereof during operation. The pressure shell has sufficient diameter along the lower end portion of the heat recovery chamber to provide an annular outflow channel for abruptly reversing flow of the down-flowing gases, so they exit above the water quench stage. The latter stage is positioned immediately below the heat recovery stage, and such heat recovery stage is made sufficiently elongate to substantially insure solidification of molten slag globules prior to discharge into the water-quench stage, i.e. to reduce temperatures to a range of from about 1300° to about 1800° F. from the reaction temperature of from 1800° to 3200° F. Separation of solids from the gas stream is effected within the lower open end of the heat exchanger when such gas stream executes an abrupt change of direction of flow so as to discharge through the aforementioned annular outflow channel. This arrangement minimizes, if not entirely eliminates, deposition of molten slag and adherance of same to interior surfaces of the apparatus. As an additional aid in this respect, it is desirable that the lower end of the combustion chamber converge somewhat toward the axial center of the apparatus, so molten material will be kept away from impingement against the water-wall heat exchanger.

THE DRAWING

Apparatus constituting an embodiment of the invention presently considered to be the best mode of carrying it out in practice is illustrated in the accompanying drawing, in which:

FIG. 1 is a somewhat schematic, vertical central section taken through the apparatus;

FIG. 2, a horizontal section taken on the line 2—2 of FIG. 1 and drawn to a larger scale; and FIG. 3, a horizontal section taken on the line 3—3 of FIG. 1 and drawn to the larger scale of FIG. 2.

DETAILED DESCRIPTION OF THE ILLUSTRATED EMBODIMENT

In the presently preferred, illustrated form of the invention, the apparatus, constituting a multiple stage, downflow gasifier for converting carbonaceous solids to an intermediate heating value fuel gas or synthesis gas, comprises a first stage 10 providing a combustion chamber 11, a second stage 12 providing a heat recovery chamber 13, and a third stage 14 providing a quench chamber 15 for residual solids that exit through the open lower end portion 14a of such third stage.

Refractory means 16, such as refractory brick or a tubular body of molded refractory, defines combustion chamber 11 and desirably converges inwardly at its ends to provide a lower lip 16a and an upper lip 16b for purposes to be explained.

Heat recovery chamber 13 is defined by a water wall type of heat exchanger 17 within a pressure shell 18, its lower end 18a being within a lower extension 19 of such pressure shell, which continues on to partially define quench chamber 15 and to connect with an outflow conduit 20 providing discharge for quench water and quenched solids through the open lower end portion 14a of the third or water-quench stage of the apparatus to, for example, a conventional type of slag breaker (not shown).

Heat exchanger 17 is preferably constructed of a series of closely associated, heat exchange tubes 17a extending between an inflow header 17b, which is arranged to receive a coolant liquid such as water from any suitable source of same through a supply pipe 21, and an outflow header 17c, which is arranged to discharge through a pipe 22 to, for example, a conventional steam drum (not shown). Tubes 17 are preferably interconnected by fins 17d extending longitudinally of respective tubes 17 as an integral part thereof and welded along their lengths to respective immediately adjacent tubes so as to provide an imperforate annular wall surrounding and enclosing heat recovery chamber 13. It is advantageous to extend the tubes 17a and the fins 17d upwardly about refractory wall 16 that defines combustion chamber 11 and to support such refractory wall 16 on an annular bracket 23 which is intimately secured to the tubes 17a as by welding, all as illustrated in FIG. 1, so as to also extract heat from such refractory and cool it. While such tubes and fins are shown as spaced somewhat from pressure shell 18 and refractory wall 16, they could be embedded in the refractory material of wall 16.

As previously indicated, heat recovery chamber 13 should be sufficiently elongate to effect solidification of molten slag, passed to it from combustion chamber 11, prior to discharge thereof into water quench chamber 15. The actual length of the heat recovery stage for this purpose will, in any given instance, depend upon the rate of heat exchange between reaction products and the water passing through water wall 17, which will be an engineering design factor for each installation.

Typical apparatus of the invention will have a pressure shell four feet in diameter capable of withstanding pressures as high as 1500 pounds per square inch. Individual tubes 17a will be from one to two inches in diameter and capable of sustaining internal pressures as high as 2000 psi.

Provision is made within the lower portion of heat recovery stage 13 for separation of solidified slag globules from the product gas and for discharge of such product gas from the apparatus separately from the slag. Such provision advantageously takes the form of an annular, reverse flow, discharge passage 24, defined by the lower extension 19 of the pressure shell 18 and leading to a discharge passage 25 for the product gas. Such discharge passage is connected in any suitable manner to storage or utilization means (not shown) for the product gas and is desirably lined with refractory material 25a.

A water jacket 26, with water inlet 26a and water outlet 26b, is provided about extension 19 of the pressure shell for cooling purposes, as is also a separate water jacket 27, with water inlet 27a and water outlet 27b on top of refractory wall 16, the upper lip 16b of such wall being provided to supply greater cooling area.

To accommodate expansion and contraction of and to support water wall assembly 17, water supply pipe 21 and discharge pipe 22 are welded to conventional expansion compensator nozzles 28 and 29, respectively, shown only schematically. Also, as illustrated, waterwall heat exchanger 17 is spaced somewhat from pressure shell 18 and refractory wall 16 to provide an annular and substantially dead gas chamber 18b, which is narrow relative to discharge passage 24 and rises from communication therewith and along the height of such water-wall heat exchanger, being closed at its upper end.

In operation, the feed material for the gasifier, which is preferably oxygen and steam and pulverized coal entrained in a stream of recycled product gas as in the case of the aforementioned patented apparatus, is introduced into the upper end of combustion chamber 11, as indicated in FIG. 1, while cooling water is introduced into inflow header 17b and quench water into spray head 30 of quench chamber 15.

A gasifying reaction takes place in combustion chamber 11 in a manner similar to the patented apparatus, and the reaction products are crowded toward the center of combustion chamber 11 by refractory lip 16a and pass downwardly through heat recovery chamber 13, the molten slag tending to remain toward the center or axis of the chamber and away from impingement against water wall 17. Abrupt reversal in direction of flow of the product gas steam, so as to discharge through annular passage 24, effects separation therefrom of the solidified slag and of any fly ash or unreacted coal, which continue on through water quench chamber 15 and to discharge through portion 14a of the water quench stage of the apparatus.

It should be noted that an important feature of the present invention is the fact that the internal diameter of water wall 17 can and should be made large enough relative to the outlet of combustion chamber 11 that downward flow of reaction products therethrough will be laminar and such that globules of molten slag will not impact on heat exchange surfaces. This again is a function of engineering design.

Whereas this invention is here illustrated and described with specific reference to an embodiment thereof presently contemplated as the best mode of carrying out such invention in actual practice, it is to be understood that various changes may be made in adapting the invention to different emobdiments without departing from the broader inventive concepts disclosed herein and comprehended by the claims that follow.

I claim:

1. A multiple stage, downflow gasifier for converting carbonaceous solids to an intermediate heating value fuel gas or synthesis gas, comprising a first stage having refractory means defining a combustion chamber; a second stage below said first stage and having a relatively elongate heat recovery chamber for solidifying molten reactants, said chamber being defined by an annular, water-wall type of heat exchanger within a pressure shell; and a third stage below said second stage and having water quench means, the three stages being substantially aligned along a substantially vertical axis in common and interconnecting along said axis, and the water-wall heat exchanger and pressure shell of the second stage extending upwardly about said combustion chamber to define said first stage; means secured to said water-wall heat exchanger for receiving and supporting said refractory means; means for introducing reaction components that include a combustion-supporting gas and carbonaceous particles into the upper end of said combustion chamber under pressure so they will pass through said first stage and into and along the heat recovery chamber of the second stage; discharge means for product gas located in said pressure shell above the lower end of said water-wall heat exchanger, the lower end portion of said pressure shell being spaced from the lower end portion of said water-wall heat exchanger to define an annular passage for the flow of product gas to said discharge means, and the portion of the pressure shell located above the annular passage for the flow of product gas to the discharge means being in communication with said annular passage, spaced from the water-wall heat exchanger a smaller distance than the lower end portion thereof, and terminating in a closed upper end to define a relatively narrow, annular, substantially dead gas chamber about the said water-wall heat exchanger substantially throughout its height; and discharge means at or near the lower end of the third stage for solids quenched in said third stage.

2. A gasifier according to claim 1, wherein a water jacket is formed by the lower end portion of the pressure shell for cooling discharge of the product gas.

* * * * *